US006950058B1

(12) United States Patent
Davis et al.

(10) Patent No.: US 6,950,058 B1
(45) Date of Patent: Sep. 27, 2005

(54) SYSTEM, METHOD, APPARATUS AND MEANS FOR PROVIDING GPS AIDING DATA TO NETWORKED RECEIVERS

(75) Inventors: Desmond Davis, San Leandro, CA (US); Yaser Rehem, Pacifica, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 10/272,451

(22) Filed: Oct. 16, 2002

Related U.S. Application Data

(60) Provisional application No. 60/330,160, filed on Oct. 17, 2001.

(51) Int. Cl.[7] ............................................. G01S 5/14
(52) U.S. Cl. ..................... 342/357.02; 342/357.09; 342/357.12
(58) Field of Search ................. 342/357.12, 357.06, 342/357.1, 357.09, 357.02; 701/213

(56) References Cited

U.S. PATENT DOCUMENTS

| 5,828,336 A | * | 10/1998 | Yunck et al. | .......... 342/357.02 |
| 6,473,030 B1 | * | 10/2002 | McBurney et al. | .... 342/357.03 |
| 6,597,984 B2 | * | 7/2003 | Appenrodt et al. | ......... 701/207 |
| 6,646,603 B2 | * | 11/2003 | Dooley et al. | .............. 342/458 |

* cited by examiner

Primary Examiner—Gregory C. Issing
(74) Attorney, Agent, or Firm—Edward C. Kwok; MacPherson Kwok Chen & Heid LLP

(57) ABSTRACT

A system, method, apparatus, and means for providing GPS aiding data to networked receivers includes capturing partial aiding data at a network device, deriving accurate aiding data from the partial aiding data, and utilizing the accurate aiding data as aiding data. In some embodiments, providing GPS aiding data further includes capturing second partial signal data at a second network device, deriving accurate aiding data from an aggregation of the partial aiding data and the second partial aiding data, and forwarding the accurate aiding data to the network device and the second network device. In some embodiments, this process repeats as needed to maintain accurate timing and position information within the network.

10 Claims, 5 Drawing Sheets

SYSTEM, METHOD, APPARATUS AND MEANS FOR PROVIDING GPS AIDING DATA TO NETWORKED RECEIVERS

CROSS REFERENCE TO RELATED APPLICATIONS

This application claims the benefit of U.S. Provisional Patent Application No. 60/330,160, filed Oct. 17, 2001, with the same title of this application.

FIELD OF THE INVENTION

The present invention relates to the use of positioning data in networks. In particular, embodiments of the present invention relate to the use of aiding data with networked receivers.

BACKGROUND

Global positioning system (GPS) positioning data is used by a large number of different devices and applications. Unfortunately, however, most devices and applications are limited to use outdoors in view of one or more GPS satellites or in conjunction with a network having one or more devices which have a uninhibited view of one or more satellites. For example, a business operating a computer network which is located entirely within a building which desires to utilize GPS positioning or timing information at devices on the network is currently unable to do so without use of a dedicated GPS receiver positioned in a "clear sky" position (such as a rooftop) or without continual use of external navigation data received from a source such as Thales or Omnistar.

It would be advantageous to provide a method and apparatus that overcame the drawbacks of the prior art. It would be desirable to provide a system and method which allows the use of GPS positioning and timing information in networks and with network devices which do not require a clear sky view of one or more GPS satellites. It would further be desirable to allow the use of GPS positioning and timing information without the need for a dedicated GPS receiver or other device positioned in a low attenuation environment. It would further be desirable to allow the use of GPS positioning and timing information in networks and network devices which do not require continual provision of external navigation data fed from an external data provider or from an external GPS reference station.

SUMMARY

To alleviate the problems inherent in the prior art, and to allow the use of accurate positioning and timing information in low-signal environments, a system, method, apparatus, and means for providing GPS aiding data to networked receivers includes capturing partial signal data at a network device, deriving accurate signal data from the partial signal data, and utilizing the accurate signal data as aiding data. In some embodiments, providing GPS aiding data further includes capturing second partial aiding data at a second network device, deriving accurate aiding data from the partial aiding data and the second partial aiding data, and forwarding the accurate aiding data to the network device and the second network device. In some embodiments, this process repeats as needed to maintain accurate timing and position information within the network.

In some embodiments, the deriving is performed by a central network authority such as a network server. In other embodiments, the deriving is performed by one or more network devices. In some embodiments, a bootstrap process is performed to initialize the network. In some embodiments, this bootstrap process includes receiving accurate GPS aiding data from an external data provider. In some embodiments, this bootstrap process includes receiving accurate GPS aiding data by positioning a GPS receiver in a clear sky position, allowing it to detect an accurate GPS signal.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF THE INVENTION

Applicants have recognized that there is a need for a system, method, apparatus and means for providing GPS aiding data to networked receivers. In particular, Applicants have recognized that there is a need for allowing the use of GPS aiding data in networks operating in highly attenuated environments where the networks are implemented without dedicated GPS receivers or feeds from external navigation data sources.

One benefit of embodiments of the present invention is that networks operating in attenuated environments (or environments with low GPS satellite signal strength, such as indoor networks) may utilize accurate GPS timing and positioning data without the cost, logistics, integration, and maintenance issues which are associated with the use of a dedicated GPS receiver or feed from external navigation data source. Pursuant to embodiments of the present invention, GPS aiding data for GPS and AGPS devices in the network are generated or derived from partial navigation data received by one or more of the devices in the network. The partial navigation data is aggregated to generate accurate aiding data which is then distributed throughout the network, thereby permitting faster GPS device operation and improving the sensitivity of indoor GPS operation. Other features and advantages will become apparent to those skilled in the art upon reading this disclosure.

Figure 1:
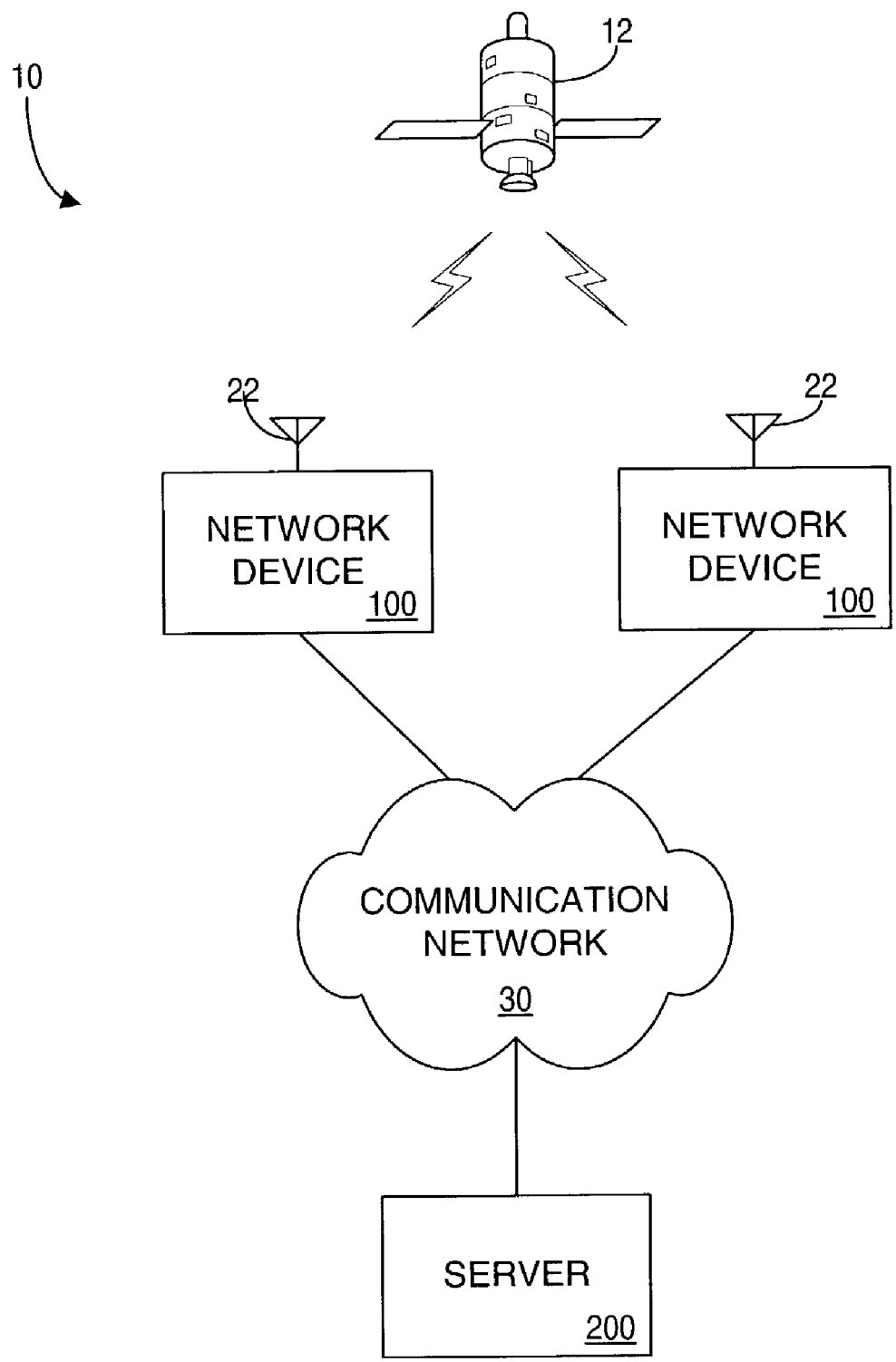
FIG. 1 is a block diagram of a system consistent with the present invention.

Referring now to FIG. 1, a system 10 according to embodiments of the present invention includes a number of network devices 100 that are in communication with each other and with one or more servers 200 via a communication network 30.

As used herein, communication network 30 may employ any of a number of different types and modes of communication, and may be for example, a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet. Moreover, as used herein, communications include those enabled by wired or wireless technology. In one example embodiment, communication network 30 is a LAN implemented using Ethernet or other network technologies.

Communication network 30 allows communication among a number of devices, including network devices 100 and one or more servers 200. In one example embodiment, network devices 100 are computers and network 30 is an office network. Server 200 may be a network server performing network functions such as storing network files, etc. Pursuant to embodiments of the present invention, one or more of the network devices 100 include an antenna 22 for receiving data signals from one or more signal sources 12. In one currently-Express preferred embodiment, signal sources 12 are the constellation of global positioning system (GPS) satellites, and the data signals include GPS navigation data, timing data, and other data known to those skilled in the art. Those skilled in the art will recognize that embodiments of the present invention may be used with other signal sources as well. Some network devices 100 may be configured as assisted GPS (AGPS) while others may be configured as unassisted devices.

Pursuant to embodiments of the present invention, some or all of the network devices 100 and their respective antennas 22 may be positioned indoors or in other environments with low GPS signal strength. Embodiments of the present invention allow system 10 to generate GPS aiding data for devices in the network despite the positioning of some or all of the network devices indoors or in an environment with low GPS signal strength. In one currently-preferred embodiment, this GPS aiding data is generated by: capturing, at one or more individual network devices 100, portions of GPS signal data (such as GPS navigation data), transmitting the captured data to one or more servers 200 in the system 10, and constructing or otherwise deriving accurate GPS aiding data based on the portions of GPS aiding data received from various network devices 100. The accurate GPS aiding data derived by server 200 is then transmitted to network devices 100 for their use. The result is a system which allows network devices to be operated indoors while still enjoying the ability to utilize accurate GPS timing and position data.

Any of a number of different types of network devices 100 may be used in embodiments of the present invention. For example, in some embodiments, some or all of the network devices 100 may be computers, such as those based on the Intel® Pentium® processor, that are adapted to communicate via communications network 30. The computer may be configured in any of a number of different manners, such as, for example, as a desk-top computer, lap-top computer, handheld computer, personal digital assistant (PDA), or the like. Some or all of the network devices 100 may include an antenna 22 to receive signal data. Some of the network devices 100 may be operated as AGPS devices without an antenna. Some or all of the network devices 100 may be configured as other devices, such as, for example, wired or wireless telephones or the like.

One or more servers 200 may be used in embodiments of the present invention. Server 200 may be configured in any of a number of ways known to those skilled in the art, such as, for example, an Intel® Pentium® based-computer or the like. In some embodiments, system 10 includes server 200 which is operated to collect signal data received from one or more network devices 100 and to generate aiding data from the signal data received from the network devices. Any number of network devices 100 and servers 200 may be used in systems pursuant to embodiments of the present invention.

Figure 2:
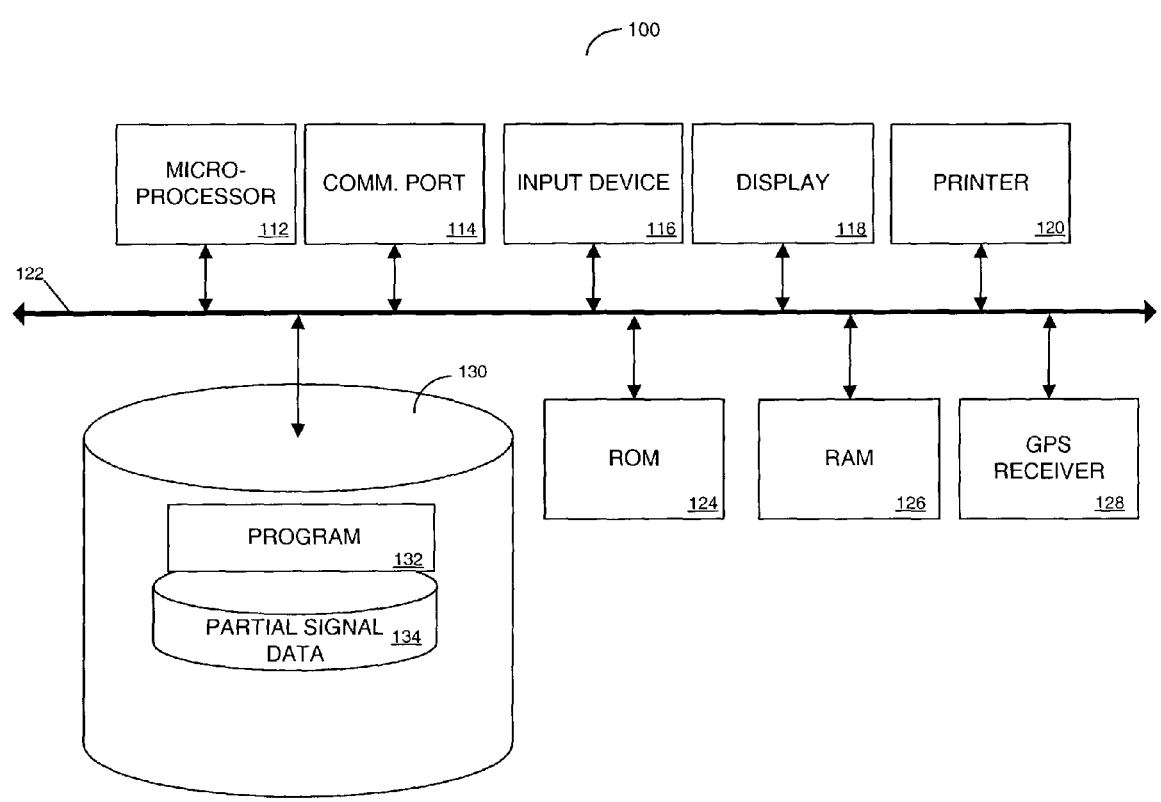
FIG. 2 is a block diagram of one embodiment of a network device of the system depicted in FIG. 1.

FIG. 2 illustrates an embodiment of a network device 100. Any or all of the network devices 100 of the system of FIG. 1 may be implemented as a system controller, a dedicated hardware circuit, an appropriately programmed general purpose computer, or any other equivalent electronic, mechanical or electro-mechanical device. As illustrated, network device 100 includes a microprocessor 112 in communication with a communication bus 122. Microprocessor 112 may be a Pentium®, RISC®-based, or other type of processor and is used to execute processor-executable process steps so as to control the components of network device 100 to provide desired functionality.

Also in communication with communication bus 122 is a communication port 114. Communication port 114 is used to transmit data to and to receive data from external devices, such as, for example, server 200 via network 30. Communication port 114 is therefore preferably configured with hardware suitable to physically interface with desired external devices and/or network connections. For example, in an embodiment where network 30 is an Ethernet LAN, communication port 114 may include an Ethernet card allowing communication over the LAN.

An input device 116, a display 118 and a printer 1100 are also in communication with communication bus 122. Any known input device may be used as input device 116, including a keyboard, mouse, touch pad, voice-recognition system, or any combination of these devices. Input device 116 may be used by an participant (such as an originator or a receiver) to input message information and messaging instructions pursuant to embodiments of the present invention.

Data, instructions, and other information (such as, for example, GPS positioning or timing information) may be output and displayed to a user operating network device 100 via display 118, which may be an integral or separate CRT display, flat-panel display or the like. Display 118 is used to output graphics and text to a user operating device 100 in response to commands issued by microprocessor 112. Printer 120 is also an output device, and may be used to produce hardcopy output of data using ink-jet, thermal, dot-matrix, laser, or other printing technologies.

Some or all of the network devices 100 in the system 10 of FIG. 1 may be provided with a GPS receiver 128 which is configured to receive GPS aiding data (e.g., via an antenna). GPS aiding data received by GPS receiver 128 may be utilized by microprocessor 112 to derive GPS positioning or timing information or it may be forwarded to server 200 via network 30 to derive or otherwise generate accurate GPS navigation data for the system 10.

Network device 100 also includes memory devices coupled to communication bus 122, such as, for example random-access memory (RAM) 126, read-only memory (ROM) 124, and data storage device 130. RAM 126 may be used, for example, to provide microprocessor 112 with fast data storage and retrieval. In this regard, processor-executable process steps being executed by microprocessor 112 are typically stored temporarily in RAM 124 and executed therefrom by microprocessor 112. ROM 124 may be utilized to provide storage from which data can be retrieved but to which data cannot be stored. Accordingly, ROM 124 is typically used to store invariant process steps and other data, such as basic input/output instructions and data used during system boot-up or to control communication port 114.

Data storage device 130 stores, among other data, a program 132 including processor-executable process steps used to process and forward GPS navigation data to server 40 and to receive GPS aiding data from server 40 pursuant to embodiments of the present invention. According to some embodiments, these process steps of program 132 may be read from a computer-readable medium, such as a floppy disk, a CD-ROM, a DVD-ROM, a Zip disk, a magnetic tape, or a signal encoding the process steps, and then stored in data storage device 130.

Microprocessor 112 executes stored instructions to cause participant device 110 to operate in accordance with the process steps described in detail herein. Data storage device 130 may also store data, such as, for example, partial signal data 134 which may include portions of GPS navigation message data detected by GPS receiver 128. This data may be stored with timing information and forwarded to server 40 to allow server 40 to recreate accurate GPS aiding data from one or more partial sets of data received from individual network devices. Data storage device 130 may also store GPS aiding data received from server 40.

Data storage device 130 also includes elements that may be necessary for operation of network device 100, such as other applications, data files, an operating system, a database management system and "device drivers" for allowing microprocessor 112 to interface with devices in communication with communication port 114. These program elements are known to those skilled in the art, and are therefore not described in detail herein.

Figure 3:
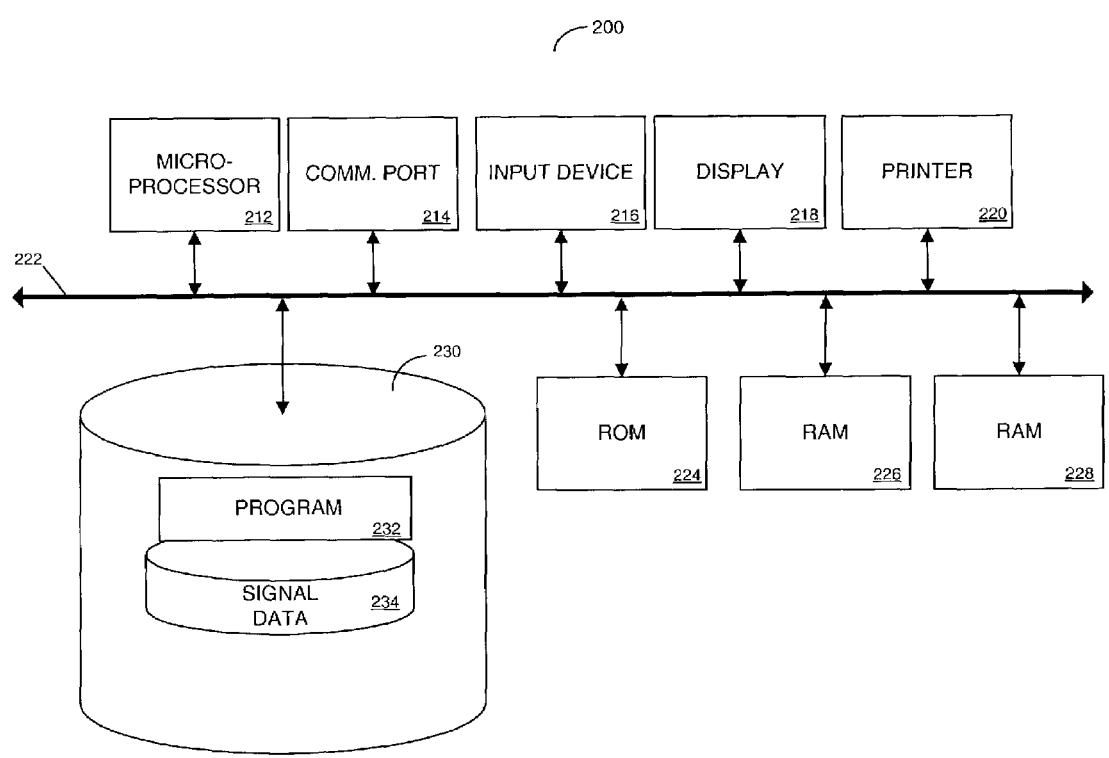
FIG. 3 is a block diagram of one embodiment of a network server of the system depicted in FIG. 1.

Referring now to FIG. 3, a block diagram of one embodiment of a server 200 is shown. Server 200 includes components similar to those described above in conjunction with FIG. 2 and which will not be repeated here other than to mention that data storage device 230 may store signal data 234 including partial GPS navigation message data received from one or more network devices 100. Pursuant to embodiments of the present invention, server 200 (or some other central network device) receives partial GPS navigation message data and combines or otherwise derives the partial data groups into an accurate GPS navigation message. Aiding data from the accurate GPS navigation message is then distributed to network devices 100 for their use in establishing positioning and/or timing information for each device.

Figure 4:
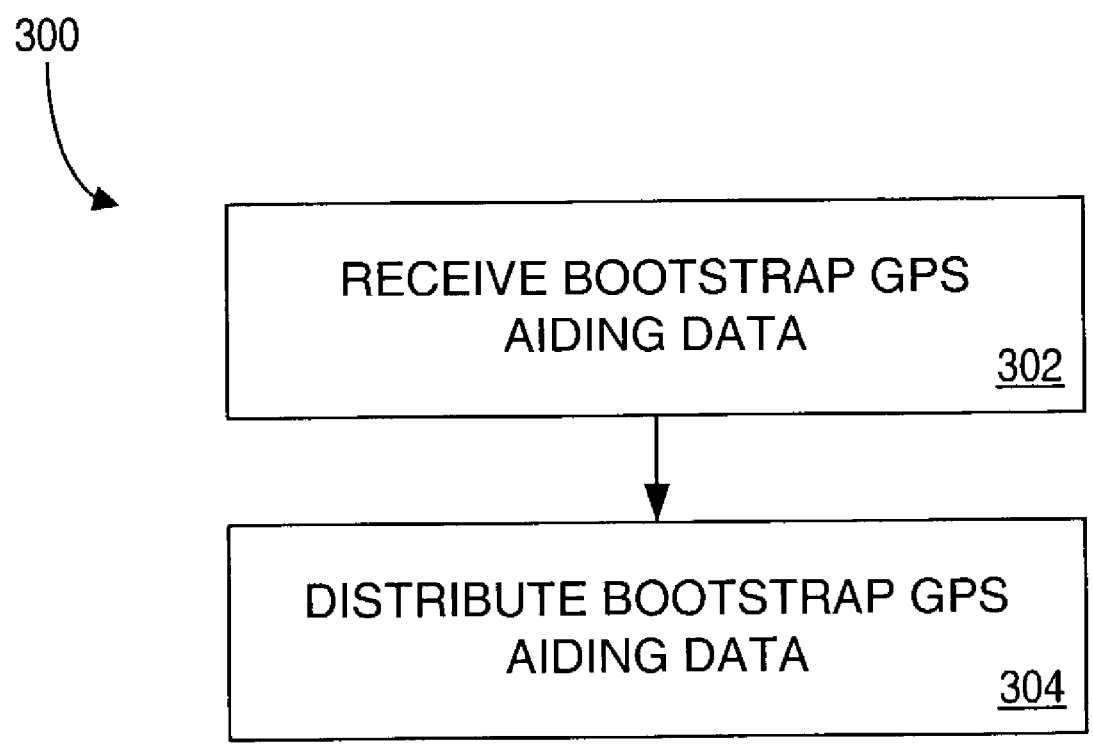
FIG. 4 is a flow diagram illustrating an exemplary process for operating a network to supply initial aiding data to multiple network devices.

A description of a process 300 for initializing a network pursuant to some embodiments of the present invention will now be provided by referring to FIG. 4. The particular arrangement of elements in the flow chart of FIG. 4 is not meant to imply a fixed order to the steps; embodiments of the present invention can be practiced in any order that is practicable. This process 300 may be performed when a network is initially set up to utilize features of the present invention. Process 300 may also be run as needed to assist network operation by providing accurate signal data to the network. Process 300 begins at 302 where bootstrap GPS aiding data is received. This bootstrap GPS aiding data may be received by one or more devices 100 of network 10, such as a server 200 and is used to initialize the network. This bootstrap GPS aiding data may be generated or received in any of a number of different ways. For example, it may be received by positioning one or more network devices 100 in a clear signal area to receive accurate GPS aiding data. This accurate aiding data is then forwarded to server 200 for processing. As another example, the accurate GPS aiding data may be received from an external data provider such as Thales or Omnistar.

Processing continues at 304 where this bootstrap GPS aiding data is distributed to network devices 100. Each network device 100 uses this signal data as aiding data to establish position and timing information. Once the devices have been accurately aided using the bootstrap GPS aiding data, process 300 is complete and processing may continue without clear data.

Figure 5:
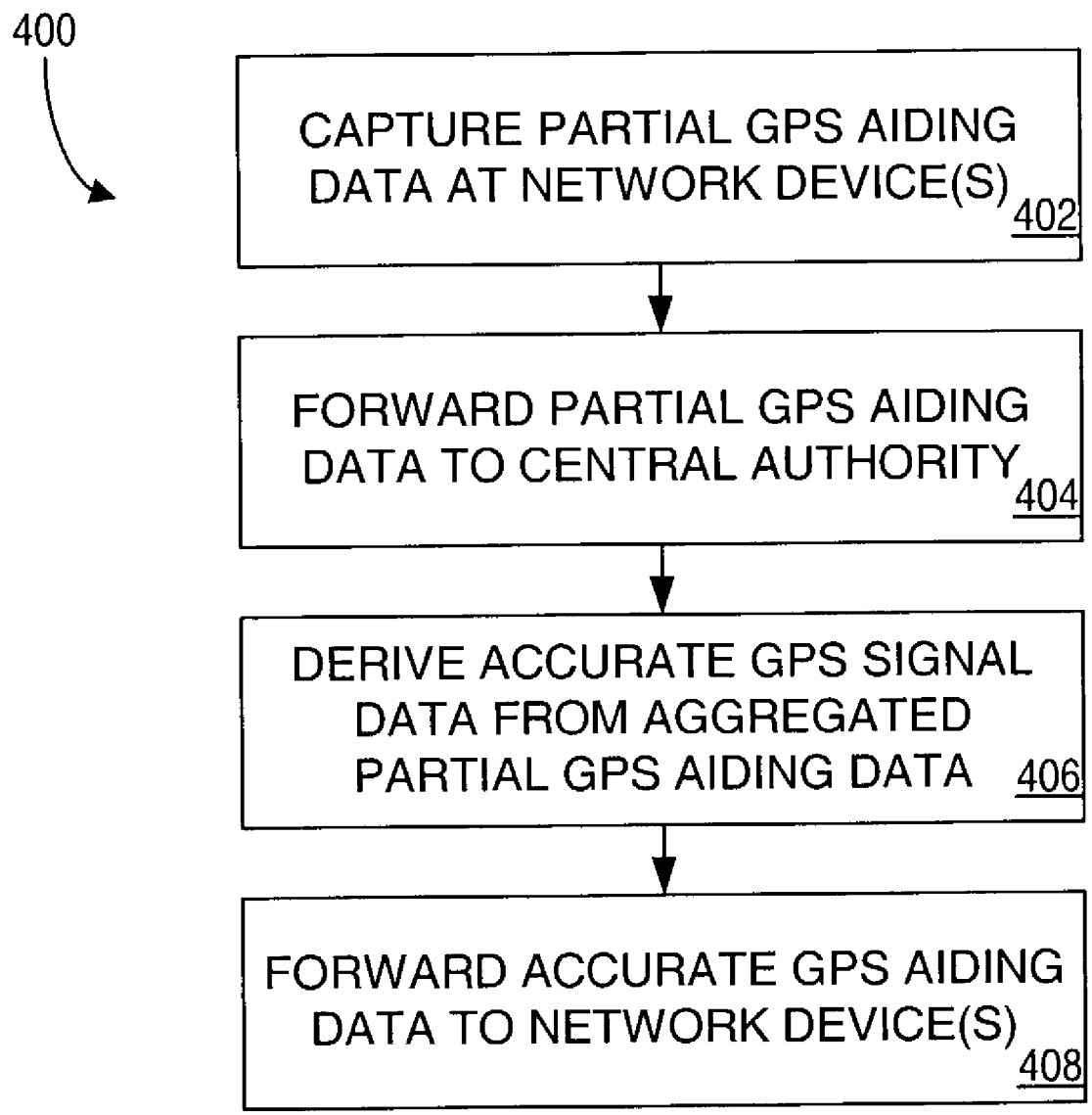
FIG. 5 is a flow diagram illustrating an exemplary process for operating a network to supply aiding data to multiple network devices operating in a low signal environment.

Referring now to FIG. 5, a process 400 is shown for operating network 10 pursuant to embodiments of the present invention. Process 400 may be a continuously-cycling process that repeats to ensure that network devices have accurate position and timing information. Process 400, in some embodiments, may require that the initializing process 300 first be run to initialize the network.

Process 400 begins at 402 where partial GPS aiding data is captured at one or more network device(s) 100. For example, where embodiments of the present invention are utilized in a corporate LAN, and where the network devices 100 are a number of personal computers having GPS receivers, processing at 402 involves capturing partial GPS aiding data at a number of the personal computers. Because such devices are typically in attenuated locations (e.g., at best with a partial sight of a GPS satellite through an office window or skylight), the GPS receiver of each network device may only capture partial GPS aiding data. Once this partial GPS aiding data is captured at 402, processing continues at 404 where the partial GPS aiding data is forwarded to a central authority such as server 40.

Because GPS navigation data is transmitted every 20 mS, processing at 402 and 404 is performed in a synchronized manner to allow the central authority to aggregate GPS aiding data from different network devices within the same GPS navigation signal cycle. Processing continues at 406 where accurate GPS aiding data is derived from the partial GPS aiding data received at 404. In one currently preferred embodiment, this processing at 406 is performed on aggregated GPS aiding data which has been collected from a different network devices 20 in system 10.

In some embodiments, processing at 406 is performed with each GPS navigation signal cycle. In other embodiments, processing at 406 is performed only when sufficient partial GPS aiding data has been received from the network devices. Processing at 406 may include combining partial data received from each network device as well as deterministic processing adapted to predict missing navigation bits. Those skilled in the art will recognize that a number of techniques have been developed to predict missing navigation bits and that any of a number of such techniques may be used in conjunction with embodiments of the present invention.

Once accurate GPS aiding data has been derived at 406, the data is forwarded as aiding data to one or more network devices 100 in the network 10. Each of these devices may use the aiding data in manners known in the art to achieve precise positioning and timing.

Although the present invention has been described with respect to a preferred embodiment thereof, those skilled in the art will note that various substitutions may be made to those embodiments described herein without departing from the spirit and scope of the present invention. For example, although an embodiment has been described where one or more central authorities or servers 200 are used to aggregate partial aiding data, in other embodiments, the partial aiding data may be aggregated at one or more of the network devices 100 which may serve the other network devices 100 in a peer-to-peer relationship.

What is claimed is:

1. A method for providing GPS aiding data to networked GPS receivers communicating over a computer network, comprising:

capturing partial signal data from GPS satellites at a plurality of the network GPS receivers, said partial signal data comprising incomplete portions of a navigation message;

aggregating the partial signal data from the plurality of network GPS receivers to derive accurate signal data; and utilizing said accurate signal data as aiding data.

2. The method of claim 1, further comprising forwarding said accurate signal data to said plurality of network GPS receivers.

3. The method of claim 1, further comprising bootstrapping said network GPS receivers using GPS signal data received from an accurate signal source.

4. The method of claim 1, wherein said accurate signal data comprises an accurate navigation message.

5. The method of claim 2, wherein said accurate signal data comprises an accurate navigation message and said aggregation comprises a combination of a first portion of a navigation message and a second of said navigation message.

6. A system for providing GPS aiding data to GPS receivers communicating over a computer network, comprising:

a plurality of network GPS receivers each capturing partial signal data from GPS satellites, said partial signal data comprising incomplete portions of a navigation message;

means for aggregating the partial signal data from the plurality of network GPS receivers to derive accurate signal data; and means for distributing said accurate signal data over the computer network as aiding data to the network GPS receivers.

7. A system as in claim 6, further comprising a server for forwarding said accurate signal data to said plurality of network GPS receivers.

8. A system as in claim 6, the networked GPS receivers bootstrap using GPS signal data received from an accurate signal source.

9. A system as in claim 6, wherein said accurate signal data comprises an accurate navigation message.

10. A system as in claim 6, wherein said accurate signal data comprises an accurate navigation message and said aggregation comprises a combination of a first portion of a navigation message and a second partial portion of said navigation message.

* * * * *